United States Patent
Johnson et al.

(10) Patent No.: US 6,535,504 B1
(45) Date of Patent: Mar. 18, 2003

(54) LINK AGGREGATION PATH SELECTION METHOD

(76) Inventors: Brian Weatherred Johnson, 23 Manor La., Lucas, TX (US) 75002; Steve H. S. Kim, 344 Concho Dr., Fremont, CA (US) 94539; Edward James Leo, Jr., 444 Saratoga Ave., Santa Clara, CA (US) 95050; Dennis Lee, 18373 Swarthmore Dr., Saratoga, CA (US) 95070

( * ) Notice: Subject to any disclaimer, the term of this patent is extended or adjusted under 35 U.S.C. 154(b) by 0 days.

(21) Appl. No.: 09/231,968

(22) Filed: Jan. 15, 1999

(51) Int. Cl.$^7$ .............................................. H04L 12/28
(52) U.S. Cl. ...................................... 370/351; 370/238
(58) Field of Search ................................ 370/237, 238, 370/248, 258, 395, 397, 399, 409, 411, 351, 230, 235

(56) References Cited

U.S. PATENT DOCUMENTS

| | | | |
|---|---|---|---|
| 5,414,701 A | * 5/1995 | Shtayer et al. .............. | 370/395 |
| 5,953,338 A | * 9/1999 | Ma et al. .................... | 370/395 |
| 6,240,066 B1 | * 5/2001 | Nagarajan et al. .......... | 370/230 |
| 6,324,185 B1 | * 11/2001 | Budhraja .................... | 370/468 |

* cited by examiner

Primary Examiner—Wellington Chin
Assistant Examiner—Brenda Pham
(74) Attorney, Agent, or Firm—Volentine Francos, PLLC

(57) ABSTRACT

A communication path selection method for sending messages between a sending communication device and a receiving communication device in a communication network chooses a best communication path for each message based on available message parameters. An index generator computes an index into a path selection table from the message parameters. Each index is assigned an entry which corresponds to one of the available communication paths. An entry generator assigns the best available communication path to each index produced from the message parameters. The method assures that messages belonging to a same conversation are sent by a same communication path to ensure that such messages are received in the proper order, and globally optimizes the distribution of messages among the available communication paths.

10 Claims, 2 Drawing Sheets

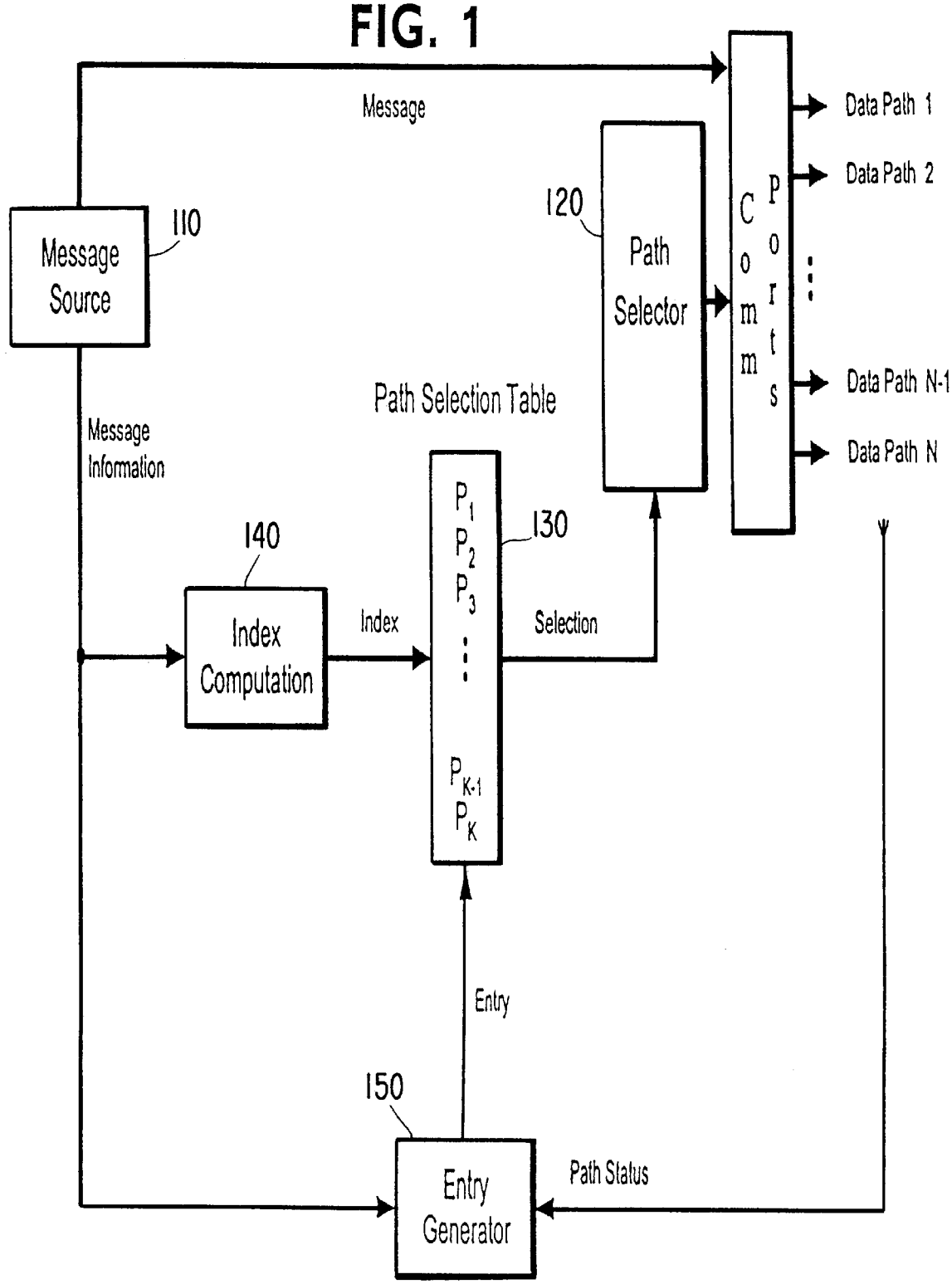

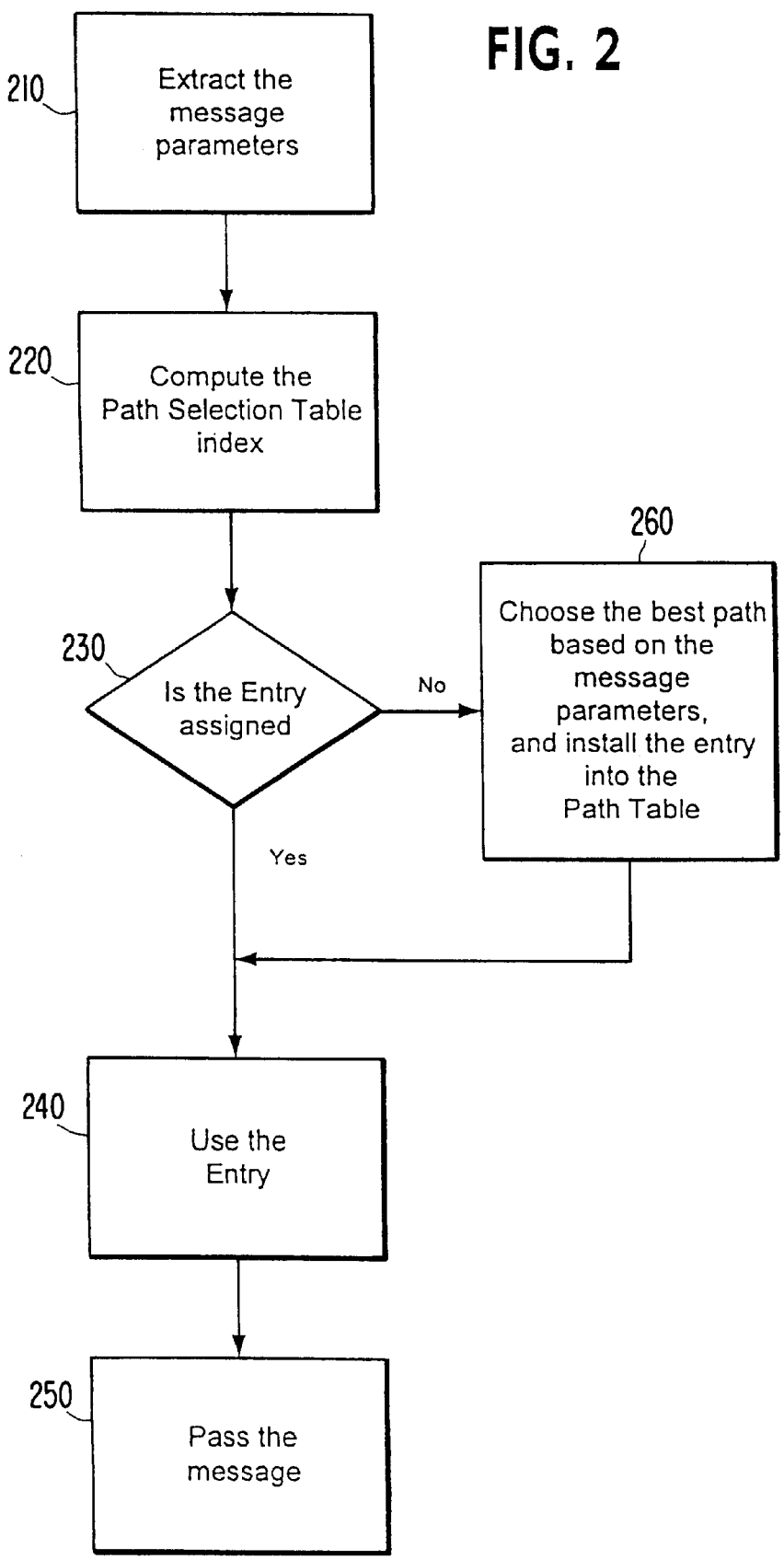

LINK AGGREGATION PATH SELECTION METHOD

BACKGROUND OF THE INVENTION

1) Field of the Invention

This invention pertains to the field of communication networks, and, more specifically, to a method of link aggregation and selecting communication paths for communicating messages between a sending communication device and a receiving communication device in a communication network.

2) Description of the Related Art

Link Aggregation is a method of communication used between communication devices whereby multiple communication paths are set up between pairs of such communication devices. Multiple communication paths are used to (1) provide more bandwidth than one such path can provide, or (2) to provide redundancy so that communication can continue even when some (but not all) of the paths are nonfunctional, or (3) both.

Messages are passed between two such communication devices. One device is the sending device; the other is the receiving 5 device. Each message is passed from the sending communication device to the receiving communication device via one of the multiple aggregated communication paths.

For each message that must pass between the two communication devices, the sending communication device must choose one of the communication paths connecting the sending communication device to the receiving communication device.

Two examples of particular communication devices for which this technique of link aggregation is useful are (1) an Ethernet switching bridge, and (2) a router. In these cases, the 15 communication paths might be Ethernet links, which might be implemented using coaxial cable, copper wire pair technology, optical fiber, or radio links. However, the technique is generally applicable to other types of devices, and other types of communication paths.

Also the same technique can be used independently between multiple pairs of communication devices simultaneously, including the case where a single communication device simultaneously participates in multiple sets of multiple communication paths. The same technique is also useful for link methods other than Ethernet including, for example, fiber distributed data interface (FDDI), integrated services digital network (ISDN), asynchronous transfer mode (ATM), and X.25.

For each message that must pass between the two communication devices, the sending communication device must choose one of the communication paths connecting the sending communication device to the receiving communication device. This choice should be made with due consideration of any or all of the following factors:

Some of the multiple communication paths may be permanently nonfunctional.

Some of the multiple communication paths may be temporarily nonfunctional.

The communication paths may be non-homogeneous, with some paths providing higher bandwidth than others.

Some communication paths may be more heavily utilized than others, and for a given message it may be desirable to choose a path based on communication path availability. This is a form of load balancing.

The communication paths may have different propagation speeds, and it may be desirable for related messages (e.g., part of a same "conversation") to be passed over the same communication path to preserve the order of the messages.

The last factor is of particular interest, because there are many communication devices that either require this characteristic, or that operate more efficiently when the communication has this characteristic. The described methodology is intended to support any or all of these characteristics, as desired.

Previous approaches to solving this problem have been based on a static determination of the communication path based on information about the messages. In effect, this methodology honors only the fifth consideration (and possibly the first consideration) of the above list. In these methods, the message information that identifies a particular "conversation" is used to statically compute a specific communication path number, and all such messages are always sent via that particular path. If the communication path is nonfunctional for some temporary reason, then the message is lost. There is no consideration of whether a different communication path would have been a better choice for some dynamic reason.

Accordingly, it would be advantageous to provide a communication path selection methodology which takes account of any or all of the factors outlined above for selecting a path for passing a message. It would also be advantageous to provide a communication path selection method which is more dynamic and adaptive to changing needs and conditions. Other and further objects and advantages will appear hereinafter.

SUMMARY OF THE INVENTION

The present invention comprises a system and method of link aggregation and path selection in a communication network.

In one aspect of the invention, a sending communication device evaluates all links to a target receiving communication device and selects a best path for each message based on available message parameters. The sending communication device computes an index into a path selection table from the message parameters for each message. Each index identifies one of the available communication paths by which that particular message should be sent.

In another aspect of the invention, an entry generator assigns the best available communication path to each index produced from the message parameters. The method assures that messages belonging to a same conversation are sent by a same communication path to ensure that such messages are received in the proper order. The method also dynamically evaluates the availability of each functional path and globally optimizes the distribution of messages among the available communication paths subject to applicable constraints.

BRIEF DESCRIPTION OF THE DRAWINGS

FIG. 1 is a block diagram showing components of a transmitting communication device which may perform a link aggregation and selection method according to the present invention.

FIG. 2 is a flowchart of a method of link aggregation and communication path selection.

DESCRIPTION OF THE PREFERRED EMBODIMENTS

Embodiments and other aspects of the invention described herein, including the system embodiments described below, may be made or used in conjunction with inventions described, in whole or in part, in commonly assigned co-pending U.S. patent application Ser. No. 09/231,967 filed on Jan. 15, 1999 in the name of inventors Brian Johnson, Steve Kim, Edward Leo, Jr. and Dennis Lee, entitled "LOW COST LINK AGGREGATION METHOD AND SYSTEM" which is hereby incorporated by reference for all purposes as if fully set forth herein.

FIG. 1 shows components within a sending communication device which performs the transmission side of link aggregation according to a one or more aspects of the present invention. The sending communication device includes a message source 110. The messages may either be received from somewhere else to be forwarded, or they may be generated from within the sending communication device.

The message source 110 passes messages to one or more communication paths. Each communication path may represent one communication port in the sending communication device. The path selector then determines which of the communication paths transmits the message. For example, the message source 110 may store the messages in a message buffer in the communication device. Each communication port may then access messages from message source 110 via the message buffer according to a list of message addresses stored in a FIFO associated with each port. In that case, the path selector may select a communication port to transmit a particular message by storing in that port's FIFO a pointer to the particular message. Other methods of message access and transmission are possible, with the path selector selecting the selected communication port(s) for transmitting each message.

The path selector selects among "N" possible communication paths for sending each message between the sending communication device and a receiving communication device in the communication network. The path selector 120 responds to a communication path selection signal from a path selection table 130 which identifies a communication path for the message to be transmitted, as will be described more fully below.

Meanwhile, information containing relevant parameters from each message supplied to the path selector 120 is also supplied to an index generator 140. Such information may be located in a message header, for example. As discussed above, communication paths may have different propagation speeds, and it may be desirable for related messages to be passed over the same path to preserve the order of the messages. Accordingly, the information which is passed to the index generator 140 identifies a "conversation" of which the message is a part. The information used to compute the index from the message information (to identify the "conversation") can be anything suitable for the communication device technology. For instance, for an Ethernet device, the index computation could be based on the source MAC address, the destination MAC address, and perhaps the Virtual LAN identification, if any. A higher level routing device could use information taken from deeper within the message, e.g., the IP addresses of the correspondents. For media types other than Ethernet, some other information that identifies the "conversation" could be used to compute the index. For virtual circuit technologies, the virtual circuit number would suffice. From this information, the index generator 140 computes an index into a path selection table 130. The computed index must be within the range [1 . . . K] of the path selection table 130.

The path selection table 130 contains "K" entries, each of which can either specify a particular communication path, or can be unassigned. Each entry can be accessed using a unique index value. Each entry which is assigned specifies the appropriate communication path for the message for which that index is computed. Each unassigned entry does not specify a communication path, and the entry must become assigned before any message resulting in that index can be transmitted. Assigned entries must have a value in the range [1 . . . N], matching the "N" communication paths available to the path selector 120. In order for all of the communication paths to be simultaneously usable, K must be equal to, or greater than, N. The size of the path selection table 130 affects the degree to which the communication paths can be optimally utilized. Using large values of K increases the likelihood that the index determination for unrelated messages will result in distinct computed indices. Distinct computed indices permit separate communication path selection decisions, and separate communication path selection decisions permit better load balancing.

The path selector 120 transmits a message via the communication path determined by the (assigned) entry in the path selection table 130 indexed by the computed index for the message. This component may operate in whole or in part according to a method disclosed in the previously mentioned U.S. patent application Ser. No. 09/231,967, "LOW COST LINK AGGREGATION METHOD AND SYSTEM". An entry generator 150 generates an entry for the path selection table 130 when an index computed for the message selects an unassigned entry in the path selection table. This generation is performed with due consideration of the factors which are important to the application, including those listed above in the "Background."

A flowchart for a preferred embodiment of a communication path selection method is shown in FIG. 2. This methodology inherently preserves the transmission sequence of all messages having the same computed index, by passing all such messages via the same communication path, in compliance with the fifth factor listed above.

In a step 210, when a message is to be transmitted, parameters are extracted to compute an associated index. Next, in a step 220, the associated index is computed. The index is used to select the associated entry in the path selection table 130.

In a step 230, it is determined whether or not the computed index has been assigned an entry. If the entry is assigned, then in a step 240 the assignment is given to the path selector 120. Finally, in a step 250, the message is transmitted using the selected communication path.

If the entry is not assigned, then in a step 260 the entry generator 150 must generate and install a new entry into the path selection table 130 before the message is transmitted. Once this has been done, then the message can be transmitted as it would have been had the entry already been assigned.

In a preferred embodiment, entries in the path selection table 130 time out when a predetermined time interval elapses without a message having that index being passed. A timed out entry then becomes unassigned. By becoming unassigned, it becomes available for a new assignment, enabling the system to dynamically make a new assignment for that index at some future time. This makes the system dynamic and adaptive, without requiring any form of complex global optimization.

When entry time out is employed, it is preferable that the time out interval be set sufficiently long such that all previously passed messages have been delivered, so that future selection of a new path for the index does not select a new faster path that will permit new messages to be delivered ahead of older messages in violation of the sequencing constraint.

When a new entry is generated, the entry generator 150 selects the "best" communication path for the message, as follows. The "best" communication path is determined by the consideration of the factors listed above in the "Background." For instance, it is undesirable to select a communication path that is known not to be functional, so all such communication paths are deleted from the candidate set. In a preferred embodiment, of the functional communication paths, the one having the highest current availability is chosen. Preferably, the current availability is determined for each functional communication path by considering such factors as, e.g., the available bandwidth of each path, and/or the current temporal queued depth of messages queued to that path.

If there are multiple communication paths that are tied for "best", then the choice is made on a secondary basis, e.g., at random. When there is the possibility that individual communication paths could be nonfunctional without the knowledge of the entry generator 150, this helps improve the likelihood of selection of a working communication path. If any or all of the communication paths are unreliable, choosing the communication path at random in the absence of other criteria increases the likelihood of finding a working communication path, if the message is retransmitted at intervals in excess of the time out interval. However, the tie-breaking choice can be made on another basis, other than random. For example, the choice could be stepped through the different paths on successive trials. Once a single communication path has been selected as the "best" path, then the entry corresponding to the computed index is assigned to the selected communication path, and the message is transmitted according to that entry.

The utilization of the path selection table 130 dynamically honors the fifth factor, that of transmitting all messages belonging to a specific "conversation" through the same port, to ensure the preservation of the message sequence for all such messages.

In a preferred embodiment, some entries in the path selection table 130 could be permanently configured, with those entries reserved so that they do not time out. In that case, the index computation would also be permanently configured to generate the matching indices only for certain predetermined message types. This would permit a mixture of both static and dynamic communication path selection. This would permit global optimization if desired.

While preferred embodiments are disclosed herein, many variations are possible which remain within the concept and scope of the invention. For example, the techniques disclosed herein are equally suitable for implementation in hardware or software, or a combination thereof. Such variations would become clear to one of ordinary skill in the art after inspection of the specification, drawings and claims herein. The invention therefore is not to be restricted except within the spirit and scope of the appended claims.

What is claimed is:

1. In a communication network comprising a sending communication device, a receiving communication device, and a plurality of communication paths between said sending communication device and said receiving communication device, a method of sending messages from said sending communication device to said receiving communication device, comprising:

extracting first message information from a first message;

using said first message information to compute an index into a path selection table;

outputting from said path selection table an entry assigned to said index;

selecting a communication path corresponding to said entry, from among said plurality of communication paths, for sending said first message to the receiving communication device; and sending said first message from said sending communication device to said receiving communication device via said selected communication path, wherein said entry assigned to said index times out when a predetermined time interval has elapsed after sending said first message without sending a second message having second message information producing same said index into said path selection table.

2. In a communication network comprising a sending communication device, a receiving communication device, and a plurality of communication paths between said sending communication device and said receiving communication device, a method of sending messages from said sending communication device to said receiving communication device, comprising:

extracting first message information from a first message;

using said first message information to compute an index into a path selection table;

determining a first subset of said communication paths consisting of functional communication paths;

assigning to said index an entry corresponding to a one of said functional communication paths;

outputting from said path selection table the entry assigned to said index;

selecting a communication path corresponding to said entry, from among said plurality of communication paths, for sending said first message to the receiving communication device; and sending said first message from said sending communication device to said receiving communication device via said selected communication path.

3. The method of claim 2, wherein assigning said entry to said index, comprises:

determining a queue depth for waiting messages for each of said functional communication paths;

assigning said entry corresponding to a one of said functional communication paths having a shortest queue depth.

4. The method of claim 2, wherein assigning said entry to said index, comprises:

determining an available bandwidth for each of said functional communication paths;

assigning said entry corresponding to a one of said functional communication paths having a greatest available bandwidth.

5. The method of claim 2, wherein said entry assigned to said index times out when a predetermined time interval has elapsed after said sending said first message without sending a second message having second message information producing same said index into said path selection table.

6. In a communication network comprising a sending communication device, a receiving communication device, and a plurality of communication paths between said sending communication device and said receiving communication device, a method of sending messages from said sending communication device to said receiving communication device, comprising:

extracting first message information from a first message;

using said first message information to compute an index into a path selection table;

outputting from said path selection table an entry assigned to said index;

selecting a communication path corresponding to said entry, from among said plurality of communication paths, for sending said first message to the receiving communication device; and sending said first message from said sending communication device to said receiving communication device via said selected communication path;

extracting second message information from a second message, belonging to a same conversation as said first message, using said second message information to compute same said index into the path selection table;

outputting from said path selection table said entry corresponding to said index; and selecting same said selected communication path, from said plurality of communication paths, corresponding to said entry for sending the second message to the receiving communication device.

7. In a communication network comprising a sending communication device, a receiving communication device, and a plurality of communication paths between said sending communication device and said receiving communication device, a method of assigning an assigned communication path for sending a message from said sending communication device to said receiving communication device, comprising:

identifying non-functional communication paths among the plurality of communication paths and determining a first subset of said communication paths consisting of functional communication paths by excluding the non-functional communication paths;

determining an availability for each of said functional communication paths;

assigning a one of said functional communication paths having a highest availability for sending said message from said sending communication device to said receiving communication device.

8. The method of claim 7, wherein determining the availability for each of said functional communication paths, comprises determining an available bandwidth for each of said functional communication paths.

9. The method of claim 8, wherein determining the availability for each of said functional communication paths further comprises:

determining a queue depth for waiting messages for each of said functional communication paths; and calculating said availability from said available bandwidth and said queue depth.

10. The method of claim 7, wherein determining the availability for each of said functional communication paths further comprises determining a queue depth for waiting messages for each of said functional communication paths.

* * * * *